US007182278B2

(12) United States Patent
Haviland et al.

(10) Patent No.: US 7,182,278 B2
(45) Date of Patent: Feb. 27, 2007

(54) SPRAY VALVE

(75) Inventors: Geoff Haviland, Brookfield (AU); Sean Haviland, Croydon (AU); Peter Williams, Carrum Downs (AU)

(73) Assignee: Anaid Nominees Pty. Ltd. (AU)

( * ) Notice: Subject to any disclaimer, the term of this patent is extended or adjusted under 35 U.S.C. 154(b) by 376 days.

(21) Appl. No.: 10/715,027

(22) Filed: Nov. 17, 2003

(65) Prior Publication Data

US 2005/0051643 A1 Mar. 10, 2005

(30) Foreign Application Priority Data

Nov. 29, 2002 (AU) .............................. 2002311382

(51) Int. Cl.
*B05B 1/32* (2006.01)
*B05B 1/00* (2006.01)
*F16K 31/00* (2006.01)

(52) U.S. Cl. ...................... 239/456; 239/451; 239/459; 239/541; 239/598; 251/63; 251/63.6

(58) Field of Classification Search ................ 239/456, 239/451, 459, 541, 598, 452, 455, 551, 562, 239/570, 583, 597; 251/63.6, 63, 63.5, 335.2
See application file for complete search history.

(56) References Cited

U.S. PATENT DOCUMENTS 3,100,083 A * 8/1963 Wardrup ..................... 239/452
3,552,658 A * 1/1971 Sons .......................... 239/456
3,853,354 A * 12/1974 Weirich et al. ............... 299/43
4,167,247 A * 9/1979 Sons et al. .................. 239/455
4,246,921 A * 1/1981 Beccaria et al. ............ 137/102

* cited by examiner

*Primary Examiner*—Kevin Shaver
*Assistant Examiner*—Darren Gorman
(74) *Attorney, Agent, or Firm*—Andrus, Sceales, Starke & Sawall, LLP

(57) ABSTRACT

Accordingly, the invention provides a spray valve comprising: (a) an upper valve body including a hydraulic chamber for receiving an incompressible hydraulic fluid through a piston port and a piston slidable within said hydraulic chamber; (b) a lower valve body including a fluid conduit for receiving fluid into the spray valve, a lower valve seating surface, an annular fluid chamber around the lower valve seating surface and a fluid outlet; and (c) a seating member between the upper valve body and lower valve body including: (i) an upper seat for the piston within the hydraulic chamber of the upper valve body; (ii) a diaphragm of resilient material extending between the upper valve body and lower valve body; and (iii) a valve seat for bearing against the lower valve seating surface and closing the fluid conduit when pressurised incompressible hydraulic fluid is received through the piston port and displacing the piston within the hydraulic chamber.

6 Claims, 3 Drawing Sheets

SPRAY VALVE

CROSS-REFERENCE TO RELATED APPLICATION

This application claims priority to Australian Application No. 2002311382, filed Nov. 29, 2002.

FIELD AND BACKGROUND OF THE INVENTION

This invention relates to a spray valve and in particular to a valve for controlling the flow of fluid from a reservoir.

There are numerous agricultural and contracting operations in which tank trucks are used to selectively spray liquid from a reservoir along particular paths where the liquid may produce some beneficial results. Spray valves which are easily controllable by a single operator from a central location such as the cab of a spray truck have been extensively used. Such operations are often conducted in a sandy or dusty environment and so utilise individual spray valves which are designed and fabricated to minimise the possibility of valve malfunctions resulting from the jamming of the valve mechanism by dust or sand. It is also desirable to utilise a valve of simple design and few parts so as to minimise the cost of construction, operations and repairs. Furthermore, as spray valves are often used on mobile operations, air operated spray control valves need to carry additional equipment to operate the valves such as air compressors or a source of compressed air.

Accordingly it is an object of the invention to provide a spray valve which requires few moving parts and can be used on a truck or vehicle without the need for additional equipment.

SUMMARY OF THE INVENTION

Accordingly, the invention provides a spray valve comprising:

(a) an upper valve body including a hydraulic chamber for receiving an incompressible hydraulic fluid through a piston port and a piston slidable within said hydraulic chamber;

(b) a lower valve body including a fluid conduit for receiving fluid into the spray valve, a lower valve seating surface, an annular fluid chamber around the lower valve seating surface and a fluid outlet; and (c) a seating member between the upper valve body and lower valve body including:

(i) an upper seat for the piston within the hydraulic chamber of the upper valve body;

(ii) a diaphragm of resilient material extending between the upper valve body and lower valve body; and (iii) a valve seat for bearing against the lower valve seating surface and closing the fluid conduit when pressurised incompressible hydraulic fluid is received through the piston port and displacing the piston within the hydraulic chamber.

When the spray valve is used for spraying fluid from a mobile tank such as those mounted on trucks or the like vehicles, the engines of the vehicles have a ready supply of pressurised hydraulic fluid which can be used to close the spray valve. The flow of hydraulic fluid to the spray valve may be controlled by the operator in the cab of the vehicle. This avoids the need for the vehicle to be fitted with an air compressor or a supply of compressed air.

In a preferred form of the invention, the lower valve seating surface is provided on a conduit sleeve fitted into the fluid conduit. The conduit sleeve is provided with a peripheral flange which sealingly contacts the lower end of the lower valve body. A base plate may be provided having a recess for receiving and locating the peripheral flange of the conduit sleeve, with the base plate being secured to the lower valve body and securing the conduit sleeve in position.

A spray pattern adjustment means may be provided around the lower valve body. The spray pattern adjustment means may include a collar having an outlet orifice and a means to adjustably secure the collar in position around the lower valve body. The outlet orifice of the collar is positioned in proximity to the fluid outlet of the lower valve body with the outlet orifice being shaped to restrict the flow of fluid from the fluid outlet of the lower valve body.

DESCRIPTION OF THE DRAWINGS

The features, objects and advantages of the present invention will become apparent from the following description of the preferred embodiment and accompanying drawings in which.

Figure 1:
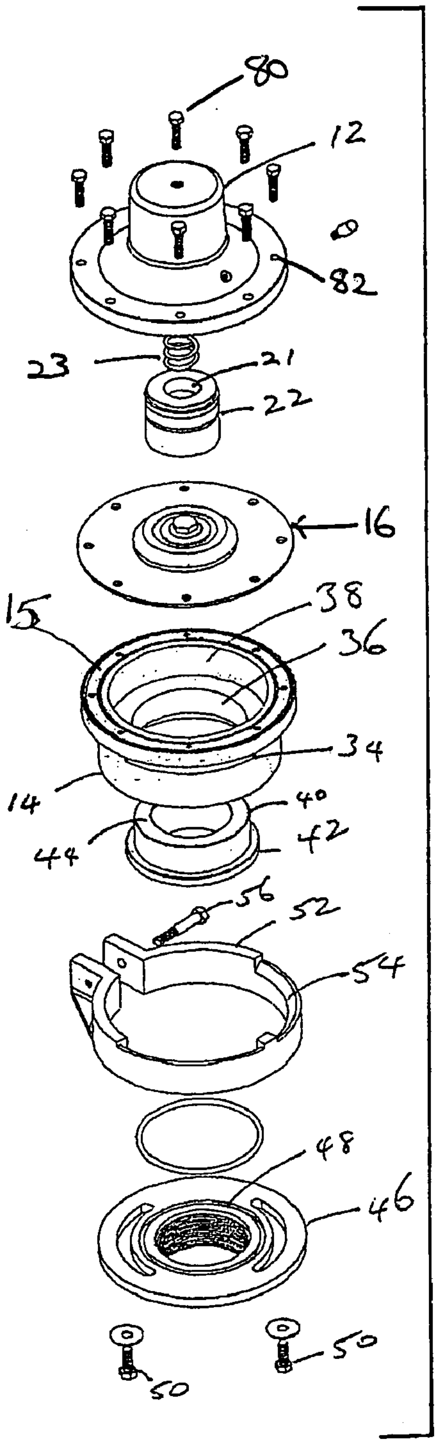
FIG. 1 is a perspective view in line for assembly of an embodiment of the present invention.
Figure 2:
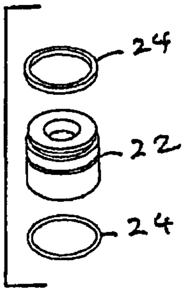
FIG. 2 is a perspective view of the piston used in the hydraulic chamber of the embodiment of FIG. 1.
Figure 3:
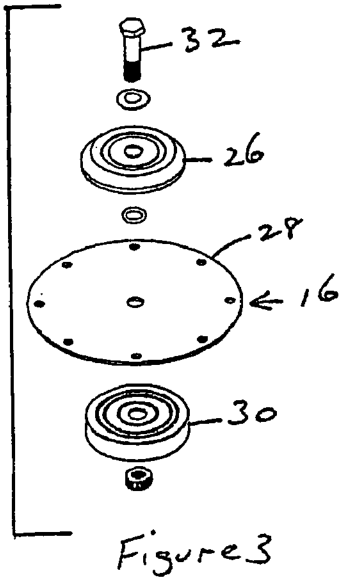
FIG. 3 is an in line for an assembly view of the internal assembly of the diaphragm seating member used in the embodiment of FIG. 1.
Figure 5:
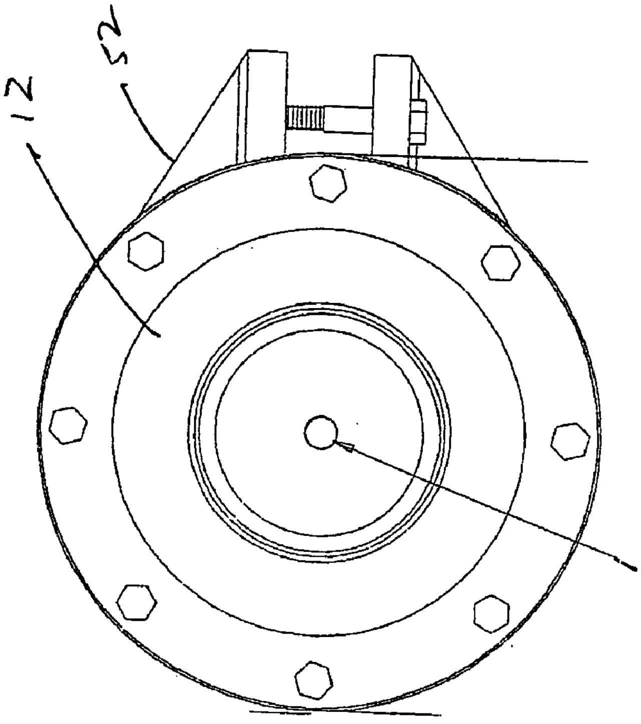
FIG. 5 is a plan view of the embodiment shown in FIG. 4.
Figure 4:
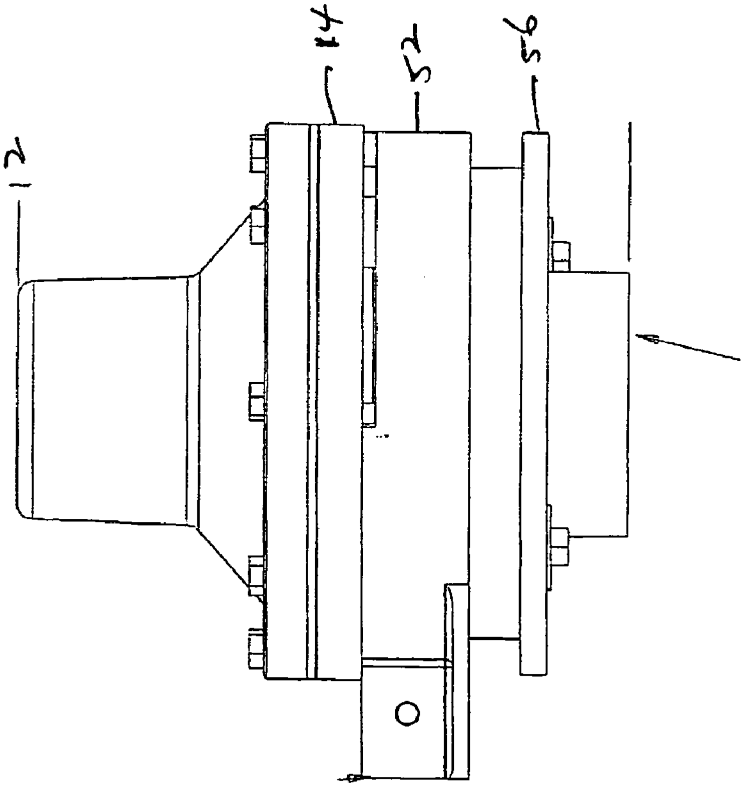
FIG. 4 is a elevational view of a spray valve in accordance with the embodiment of FIG. 1.
Figure 6:
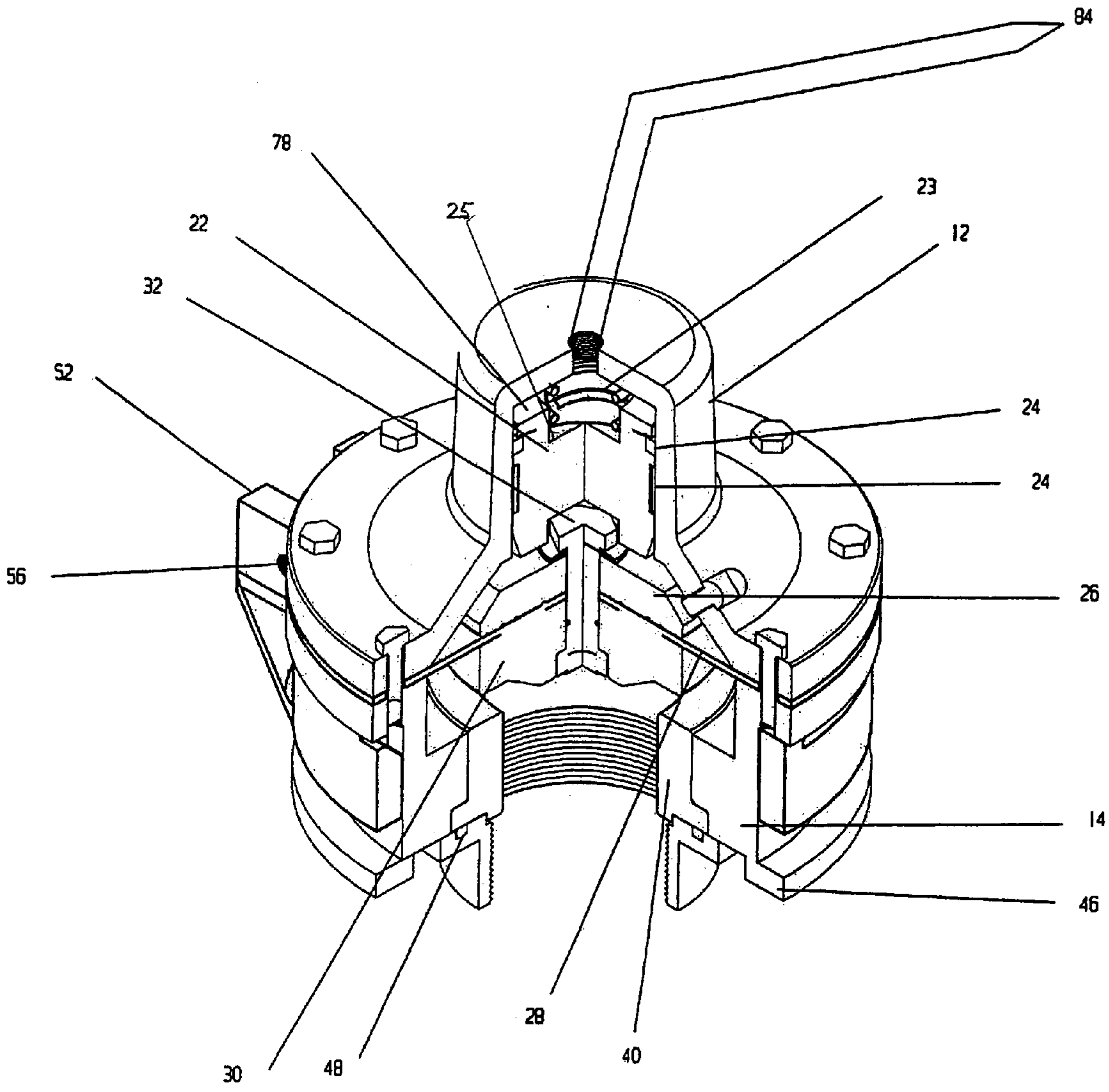
FIG. 6 is a segmented cross-sectional assembled view of a spray valve of FIG. 1 connected to a vehicle's hydraulic fluid system.

Referring to the drawings the spray valve in accordance with the invention includes an upper valve body 12, and a lower valve body 14 secured together by bolts 80 in the upper valve body which passes through holes in the diaphragm seating member 16 before being received in threaded bolt holes 82 in lower valve body 14. A seal 15 may be provided between the diaphragm seating member 16 and the lower valve body 14 to prevent fluid leaking from the lower valve body.

The upper valve body is provided with a piston port 20 for the admission of an incompressible hydraulic fluid into a hydraulic chamber (78). A piston cylinder 22 having rings 24 is provided to slide within the hydraulic chamber under the action of the hydraulic fluid. In a preferred form of the invention, the piston cylinder may be provided with a seat 25 for a spring 23 which retains pressure on the seat of the internal assembly retaining a liquid seal against static resistance in the incoming liquid line when power source to hydraulic supply is shut down.

The diaphragm seating member 16 is provided with a seat 26 which is secured to diaphragm 28 and valve seat 30 by a bolt and nut 32. The diaphragm 28 is made from a resilient material and extends between the upper valve body and the lower valve body.

The lower valve body has a fluid outlet 34, a fluid conduit 36 and an annular fluid chamber 38 which receives the valve seat 30. The lower valve body may be further provided with a conduit sleeve 40 having a peripheral flange 42 which bears against the lower surface of the lower valve body 14.

The conduit sleeve is further provided with a lower seating surface 44 which cooperates with a lower annular surface around the valve member to close the fluid conduit. The conduit sleeve 40 is held in position by a base plate 46 having a seat 48 for receiving and locating the annular flange 42. The base plate 46 is held in position against the lower valve body 14 by bolts 50 received within threaded bolt holes (not shown) in the lower valve body.

A spray pattern adjustment means may be provided. The means shown includes a collar 52 having spray orifice 54 formed therein. The collar 52 may be adjustably secured to the lower valve body 14 by an adjustment bolt 56. The collar which fits around the lower valve body is fitted so that the outlet orifice 54 is positioned in proximity to the fluid outlet 34 of the lower valve body 14 and can be adjusted to restrict or open the flow from the fluid outlet 34.

The base plate 46 may further be provided with a screw thread attachment which communicates with the fluid outlet of the spray valve to enable the spray valve to be connected to a pressurised fluid source.

As mentioned above, the piston part 20 is connected to a source of incompressible hydraulic fluid (i.e., vehicle's hydraulic fluid system 84). The vehicle's hydraulic fluid system preferably includes a hose connected to the power source of the vehicle through a three way control valve which can be activated by the driver from the cab of the vehicle to which the spray valve is mounted. When the control valve is deactivated, incompressible hydraulic fluid can be exhausted to a reservoir to allow the spray valve to open and allow the pressure of the liquid in the conduit to be discharged from the spray valve.

The invention claimed is:

1. A spray valve for connection to a vehicle's hydraulic fluid system comprising:

(a) an upper valve body including a hydraulic chamber for receiving an incompressible hydraulic fluid from the vehicle's hydraulic fluid system through a piston port and a piston slidable within said hydraulic chamber;

(b) a lower valve body including a fluid conduit for receiving fluid into the spray valve, a lower valve seating surface, an annular fluid chamber around the lower valve seating surface and a fluid outlet; and (c) a seating member between the upper valve body and lower valve body including:

(i) an upper seat for the piston within the hydraulic chamber of the upper valve body;

(ii) a diaphragm of resilient material extending between the upper valve body and lower valve body; and (iii) a valve seat for bearing against the lower valve seating surface and closing the fluid conduit when pressurized incompressible hydraulic fluid is received through the piston port and displacing the piston within the hydraulic chamber.

2. A spray valve according to claim 1 wherein the lower valve seating surface is provided on a conduit sleeve fitted into the fluid conduit.

3. A spray valve according to claim 2 wherein the conduit sleeve is provided with a peripheral flange which sealingly contacts the lower end of the lower valve body.

4. The spray valve according to claim 3 further provided with a base plate having a recess for receiving and locating the peripheral flange of the conduit sleeve, the base plate being secured to the lower valve body and securing the conduit sleeve in position.

5. The spray valve according to claim 1 wherein a spray pattern adjustment means is provided around the lower valve body including a collar having an outlet orifice and a means to adjustably secure the collar in position around the lower valve body.

6. The spray valve according to claim 5 wherein the outlet orifice of the collar is positioned in proximity to the fluid outlet of the lower valve body with the outlet orifice being shaped to restrict the flow of fluid from the fluid outlet of the lower valve body.

* * * * *